(12) United States Patent
Zhu

(10) Patent No.: US 12,088,749 B2
(45) Date of Patent: Sep. 10, 2024

(54) DISPLAY-MODULE ASSEMBLY AND ELECTRONIC DEVICE

(71) Applicants: Chengdu BOE Optoelectronics Technology Co., Ltd., Sichuan (CN); BOE Technology Group Co., Ltd., Beijing (CN)

(72) Inventor: Xiaolong Zhu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 1029 days.

(21) Appl. No.: 16/980,856

(22) PCT Filed: Mar. 31, 2020

(86) PCT No.: PCT/CN2020/082397
§ 371 (c)(1),
(2) Date: Sep. 15, 2020

(87) PCT Pub. No.: WO2020/233241
PCT Pub. Date: Nov. 26, 2020

(65) Prior Publication Data
US 2022/0385749 A1    Dec. 1, 2022

(30) Foreign Application Priority Data
May 22, 2019   (CN) .......................... 201910430561.8

(51) Int. Cl.
*H04M 1/02*    (2006.01)
*G02F 1/1333*  (2006.01)

(52) U.S. Cl.
CPC .... *H04M 1/0266* (2013.01); *G02F 1/133314* (2021.01); *G02F 1/133334* (2021.01); *G02F 2202/28* (2013.01)

(58) Field of Classification Search
CPC ............ H04M 1/0266; H04M 1/0269; H04M 1/0202; G02F 1/133314; G02F 1/133334; G02F 2202/28; G06F 1/1637; G09F 9/33
See application file for complete search history.

(56) References Cited

U.S. PATENT DOCUMENTS

2014/0335316 A1* 11/2014 Fukushima ............... B32B 7/12
                                                              428/161
2016/0293895 A1* 10/2016 Kim .................... H10K 50/8428
2021/0331445 A1* 10/2021 Tang .................... B32B 38/0004

FOREIGN PATENT DOCUMENTS

CN      103203949 A    7/2013
CN      203720492 U    7/2014
(Continued)

OTHER PUBLICATIONS

Office Action dated Jun. 3, 2020 for Chinese Patent Application No. 201910430561.8 and English Translation.
(Continued)

*Primary Examiner* — Paisley L Wilson
*Assistant Examiner* — Agnes Dobrowolski
(74) *Attorney, Agent, or Firm* — Ling Wu; Stephen Yang; Ling and Yang Intellectual Property

(57) ABSTRACT

A display-module assembly (100) and an electronic device (1000) are described. The display-module assembly (100) includes: a cover plate (10) including a window portion (101) and a non-window portion (102) surrounding the window portion (101); a display module (30) disposed at the inner side of the cover plate (10); a bonding layer (20) including a first bonding portion (201) and a second bonding portions (202). The first bonding portion (201) is adhered between the window portion (101) and the display module (30). An ink layer (40) is provided on the surface of the non-window portion (102) facing the display module (30).

(Continued)

The second bonding portion (202) is adhered between the ink layer (40) and the display module (30).

10 Claims, 3 Drawing Sheets

(56) References Cited

FOREIGN PATENT DOCUMENTS

| | | |
|---|---|---|
| CN | 207854300 U | 9/2018 |
| CN | 207883219 U | 9/2018 |
| CN | 108795304 A | 11/2018 |
| CN | 109658839 A | 4/2019 |
| CN | 110060583 A | 7/2019 |

OTHER PUBLICATIONS

Office Action dated Oct. 20, 2020 for Chinese Patent Application No. 201910430561.8 and English Translation.
International Search Report for PCT/CN2020/082397 Mailed Jun. 12, 2020.

* cited by examiner

DISPLAY-MODULE ASSEMBLY AND ELECTRONIC DEVICE

CROSS-REFERENCE TO RELATED APPLICATIONS

The present application is a U.S. National Phase Entry of International Application No. PCT/CN2020/082397 having an international filing date of Mar. 31, 2020, which is based on and claims priority to the Chinese patent application No.201910430561.8, filed on May 22, 2019. The contents of the above-identified applications are hereby incorporated by reference in their entirety.

TECHNICAL FIELD

The present application relates to the technical field of OLED (Organic Light-Emitting Diode) display, in particular to a display-module assembly and an electronic device.

BACKGROUND

In the related art, an ink layer is generally provided on the cover plate of AMOLED (Active-Matrix Organic Light-Emitting Diode) display-module assembly. The cover plate and the display module of the display-module assembly are bonded by solid OCA glue in a vacuum, and then deaerated by the vacuum. However, the provision of the ink layer causes a level difference. The ability of OCA to compensate the level difference is only 15%-30% of its own thickness, which tends to cause bubble defects in the bonding, resulting in product rejection.

SUMMARY

The present application intents to solve at least one of the technical problems existing in the prior art. Therefore, an object of this present application is to provide a display-module assembly which can substantially eliminate the generation of bubbles and avoid the bubble defects.

The present application also provides an electronic device which includes the display-module assembly mentioned above.

The display-module assembly according to embodiments of the present application includes a cover plate, wherein the cover plate includes a window portion and a non-window portion surrounding the window portion; a display module disposed at the inner side of the cover plate; a bonding layer including a first bonding portion and a second bonding portion, the first bonding portion being a first OCA (optical adhesive) layer and adhered between the window portion and the display module; wherein an ink layer is provided on the surface of the non-window portion facing the display module, and the second bonding portion is an OCR (liquid adhesive) layer, which is adhered between the ink layer and the display module; or, wherein the second bonding portion is adhered between the non-window portion and the display module, and the second bonding portion includes a second OCA (optical adhesive) layer and an ink layer disposed within the second OCA (optical adhesive) layer.

The display-module assembly according to embodiments of the present application may substantially eliminate the problem of bubble defects generated in the bonding process in the prior art due to the poor ability of OCA to fill the level difference, the product rejection is avoided, and meanwhile, it is helpful to achieve a thinner design of the display-module assembly.

According to some embodiments of the present application, the second OCA (optical adhesive) layer includes a first adhesive sub-layer and a second adhesive sub-layer spaced apart along the offsetting direction between the cover plate and the display module, and the ink layer is sandwiched between the first adhesive sub-layer and the second adhesive sub-layer.

According to some embodiments of the present application, the ink layer, the second OCA (optical adhesive) layer and the first OCA (optical adhesive) layer are formed integrally.

According to some embodiments of the present application, in the direction away from the center of the window portion, the non-window portion bends in an arc shape toward the display module.

According to some embodiments of the present application, the optical refractive, light transmittance and thermal expansion coefficient of the OCR (liquid adhesive) layer are the same as those of the first OCA (optical adhesive) layer.

The electronic device according to embodiments of the present application includes a housing, one side of which is open; and the display-module assembly described above is disposed on the open side of the housing.

With the display-module assembly described above, the electronic device according to embodiments of the present application may substantially eliminate the problem of bubble defects generated in the bonding process in the prior art due to the poor ability of OCA to fill the level difference, the product rejection is avoided, and meanwhile, it is helpful to achieve a thinner design of the display-module assembly.

According to some embodiments of the present application, the cover plate further includes an installing portion which surrounds the non-window portion peripherally. A step portion is formed on the end face of the open end of the housing, and the installing portion abuts against the step portion.

According to some embodiments of the present application, the step portion and the installing portion are connected by a glue layer.

According to some embodiments of the present application, t the glue layer has the same color as the ink layer.

According to some embodiments of the present application, the electronic device is a mobile phone.

Additional aspects and advantages of the present application will be partially shown or become apparent in the following description, or will be learned from practice of the present application.

BRIEF DESCRIPTION OF DRAWINGS

The above mentioned and/or additional aspects and advantages of the present application will become apparent and easy to understand from the following description of embodiments in conjunction with accompanying drawings.

Figure 1:
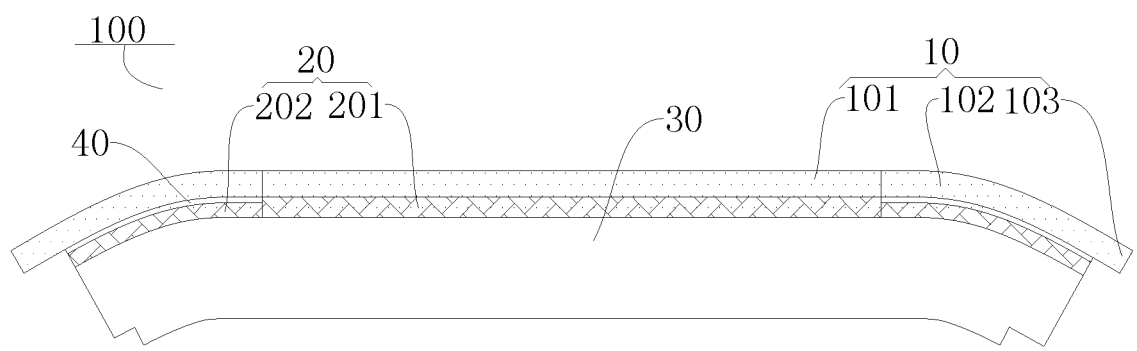
FIG. 1 is a schematic view of a display-module assembly according to a first embodiment of the present application.

Part list and corresponding reference signs:
electronic device 1000;
display-module assembly 100; cover plate 10; window portion 101; non-window portion 102; installing portion 103; bonding layer 20; first bonding portion 201; second bonding portion 202; second OCA (optical adhesive) layer 2021; first adhesive sub-layer 20211; second adhesive sub-layer 20212; display module 30; ink layer 40;
housing 200; step portion 2001;
glue layer 300

DETAILED DESCRIPTION

Descriptions will now be made in detail to embodiments, illustrations of which are shown in the accompanying drawings. The same or similar, or functionally same or similar elements are indicated by like reference numerals throughout the descriptions. The embodiments described herein with reference to the accompanying drawings are exemplary, used for explaining the present disclosure only, and should not be construed to limit the present application.

A display-module assembly 100 according to embodiments of the present application will be described below with reference to FIGS. 1-6. The display-module assembly 100 may be applied in an electronic device 1000, such as a mobile phone, to perform functions such as display for the electronic device 1000.

As shown in FIGS. 1-6, the display-module assembly 100 according to the embodiments of the present application may include a cover plate 10, a display module 30 and a bonding layer 20.

The cover plate 10 includes a window portion 101 and a non-window portion 102 surrounding the window portion 101 peripherally. The display module 30 is disposed at the inner side of the cover plate 10 and aligned with the window portion 101 and the non-window portion 102 respectively. It should be explained that when the display module 30 is applied on the electronic device 1000, "inner side" refers to the side close to the interior of the electronic device 1000.

The bonding layer 20 is disposed between the display module 30 and the cover plate 10, so that the display module 30 and the cover plate 10 are assembled together by the bonding layer 20.

Figure 3:
FIG. 3 is a schematic view of the bonding layer shown in FIG. 1.
Figure 6:
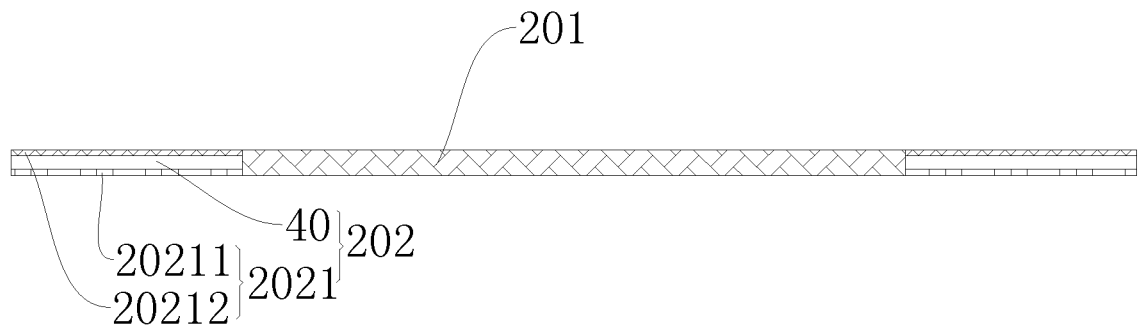
FIG. 6 is a schematic view of the bonding layer shown in FIG. 4.

Specifically, as shown in FIGS. 3 and 6, the bonding layer 20 includes a first bonding portion 201 and a second bonding portion 202. The first bonding portion 201 is a first OCA (optical adhesive) layer. As shown in FIG. 1, the first bonding portion 201 is adhered between the window portion 101 and the display module 30. As a result, the bonding between the window portion 101 and the display module 30 is achieved by applying the first portion 201, furthermore, because the first OCA (optical adhesive) is solid, the bonding process of bonding the window portion 101 and the display module 30 is simplified, the problem of glue overflow is avoid, and the reliability of the bond is improved. In addition, the first OCA (optical adhesive) may also serves as a support in the bonding process involving OCR (liquid adhesive) layer described below, so as to ensure the shape stability of the product during the process thereby ensuring successful bonding.

In the related processes, an ink layer 40 is generally provided on the cover plate 10 of display-module assembly 100. The cover plate 10 and the display module 30 of the display-module assembly 100 are bonded by solid OCA in a vacuum, and then deaerated by the vacuum. The inventor found in practical research that the provision of the ink layer 40 causes a level difference. Because the ability of OCA to compensate the level difference is only 15%~30% of its own thickness, which tends to cause bubble defects in the bonding, resulting in product rejection.

Figure 2:
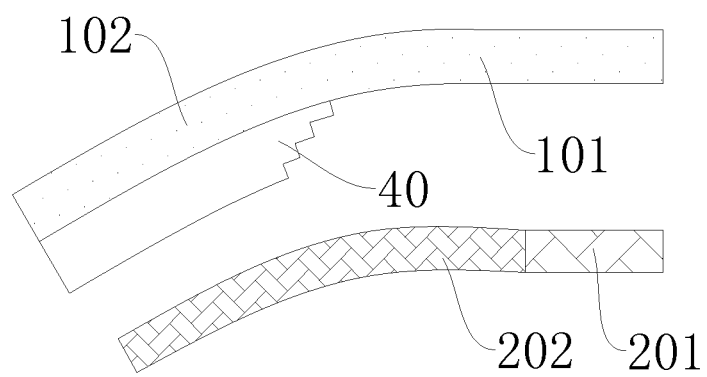
FIG. 2 is an exploded schematic partial view of the structure shown in FIG. 1.

In some optional embodiments of this present application, as shown in FIG. 1 and FIG. 2, the surface of the non-window portion 102 facing the display module 30 is provided with an ink layer 40. The second bonding portion 202 is an OCR (liquid adhesive) layer, which is adhered between the ink layer 40 and the display module 30. That is, while the surface of the non-window portion 102 facing the display module 30 is provided with an ink layer 40, the second bonding portion 202 sandwiched between the ink layer 40 and the display module 30 is an OCR (liquid adhesive) layer. It can be understood that under certain temperature changes, the status of the OCR (liquid adhesive) layer will be transformed between liquid and solid. Since the OCR (liquid adhesive) layer is liquid during the process of bonding the non-window portion 102 and the display module 30, the liquid OCR (liquid adhesive) layer is conducive to filling and compensating against the ink, ensuring improved filling capacity and compensating capacity for level difference caused by the ink, without affecting the process stability, so that it is possible to substantially eliminate the problem of bubble defects generated in the bonding process in the prior art due to the poor ability of OCA to fill the level difference, the product rejection is avoided, and meanwhile, it is helpful to achieve a thinner design of the display-module assembly 100.

Optionally, the optical refractive, light transmittance and thermal expansion coefficient of the OCR (liquid adhesive) layer are the same as those of the first OCA (optical adhesive) layer. This is helpful to ensure the reliability of display-module assembly 100.

Figure 4:
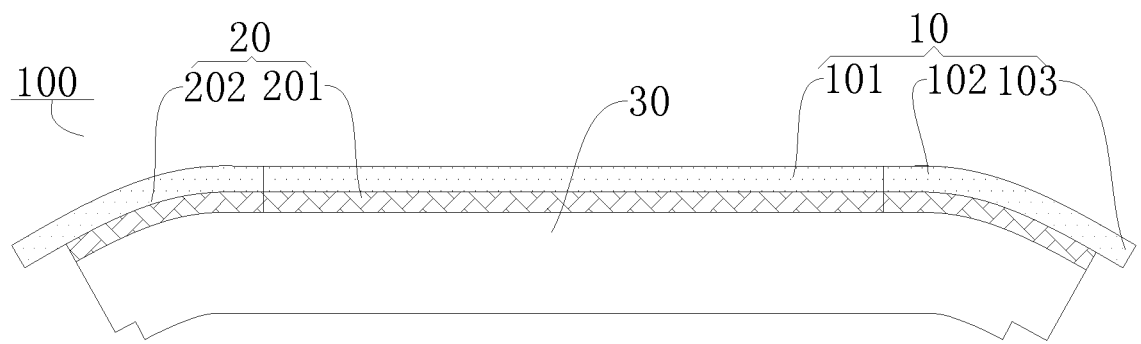
FIG. 4 is a schematic view of a display-module assembly according to a second embodiment of the present application.
Figure 5:
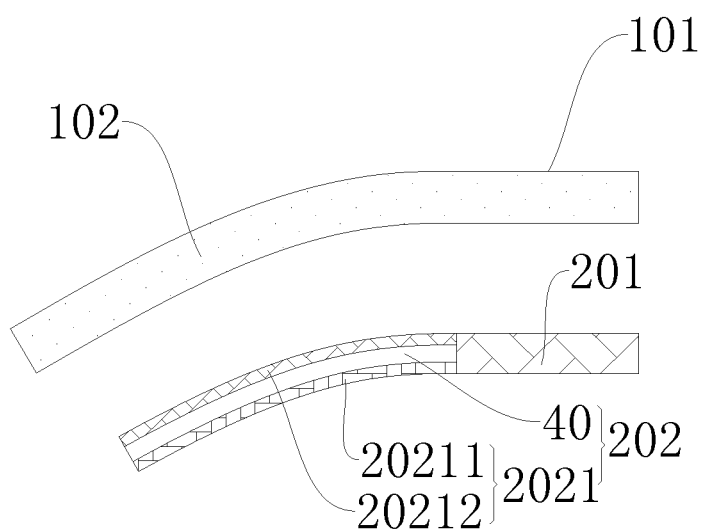
FIG. 5 is an exploded schematic partial view of the structure shown in FIG. 4.

In other optional embodiments of the present application, as shown in FIGS. 4-6, the second bonding portion 202 is adhered between the non-window portion 102 and the display module 30. The second bonding portion 202 includes a second OCA (optical adhesive) layer 2021 and an ink layer 40 disposed within the second OCA (optical adhesive) layer 2021. That is, instead of providing the ink layer 40 on the cover plate 10 as the prior art, the ink layer 40 is disposed within the second OCA (optical adhesive) layer 2021, so that the second bonding portion 202 and the first bonding portion 201 with substantially the same thickness can be used for bonding when the cover plate 10 and the display module 30 are adhered by the bonding layer 20, which is helpful to a better fit, thus the bonding effect can be improved. By doing so, the problem of the level difference caused by the ink layer 40 in the related art is solved, thereby substantially eliminating the problem of bubble defects generated in the bonding process in the prior art due to the poor ability of OCA to fill the level difference, the product rejection is avoided, the process stability is not affected, and meanwhile, it is helpful to achieve a thinner design of the display-module assembly 100. Moreover, disposing the ink layer 40 within the second OCA (optical adhesive) layer 2021 is also helpful to ensure the bonding ability of the second bonding portion 202, thereby the reliability of bonding the second bonding portion 202 respectively with the non-window portion 102 and the display module 30 is improved.

The display-module assembly 100 according to the embodiments of the present application may substantially eliminate the problem of bubble defects generated in the bonding process in the prior art due to the poor ability of OCA to fill the level difference, the product rejection is avoided, and meanwhile, it is helpful to achieve a thinner design of the display-module assembly 100.

In some embodiments of this present application, as shown in FIG. 5 and FIG. 6, the second OCA (optical adhesive) layer 2021 includes a first adhesive sub-layer 20211 and a second adhesive sub-layer 20212 spaced apart along the offsetting direction between the cover plate 10 and the display module 30. That is, in the offsetting direction between the cover plate 10 and the display module 30, the first adhesive sub-layer 20211 and the adhesive second sub-layer 20212 are spaced apart and the ink layer 40 is sandwiched between the first adhesive sub-layer 20211 and the second adhesive sub-layer 20212. Specifically, for example, during the preparation of the second bonding portion 202, a layer of first adhesive sub-layer 20211 may be laid first, then a layer of ink layer 40 may be printed on the first adhesive sub-layer 20211, and finally the second adhesive sub-layer 20212 may be laid on the ink layer 40, thereby the manufacture of the second bonding portion 202 is completed.

Therefore, by sandwiching the ink layer 40 between the first adhesive sub-layer 20211 and the second adhesive sub-layer 20212, specifically, for example, as shown in FIGS. 5 and 6, with the first adhesive sub-layer 20211 between the display module 30 and the ink layer 40 and the second adhesive sub-layer 20212 between the non-window portion 102 and the ink layer 40, it is helpful to ensure the bonding ability of the second bonding portion 202, thereby the non-window portion 102 and the display module 30 are reliably bonded together by the second bonding portion 202, improving the reliability of the installation.

In some embodiments of the present application, as shown in FIG. 6, the ink layer 40, the second OCA (optical adhesive) layer 2021 and the first OCA (optical adhesive) layer are formed integrally, i.e. the bonding layer 20 is formed as one piece. For example, during the actual preparation of the bonding layer 20, a first adhesive layer, including the first adhesive sub-layer 20211 and a first window adhesive layer corresponding to the window portion 101, may be prepared first, then a layer of ink layer 40 may be printed on the first adhesive sub-layer 20211, and then a second adhesive layer, including the second adhesive sub-layer 20212 and a second window adhesive layer corresponding to the window portion 101, is prepared. It can be understood that, the second window adhesive layer may be relatively thicker, so as to fill the level difference caused by the ink layer 40. Thus, the level difference caused by the ink layer 40 is compensated inside the bonding layer 20, which is simple and reliable, and is helpful to ensure the bonding ability of the bonding layer 20.

In some optional embodiments of the present application, in the direction away from the center of the window portion 101, the non-window portion 102 bends in an arc shape toward the display module 30. Therefore, the appearance of the arc-shaped display module assembly 100 can be achieved, which is helpful to improve the aesthetics of the display-module assembly 100.

Optionally, the cover plate 10 is a glass cover plate 10, for lower cost.

The specific structures of two embodiments of this present application will be described in detail below with reference to FIGS. 1-6.

Example 1

As shown in FIGS. 1-3, the display-module assembly 100 according to the embodiments of the present application may include a cover plate 10, a display module 30 and a bonding layer 20.

Specifically, the cover plate 10 includes a window portion 101 and a non-window portion 102 surrounding the window portion 101 peripherally. The display module 30 is disposed at the inner side of the cover plate 10 and aligned with the window portion 101 and the non-window portion 102 respectively. The window portion 101 has a planar form, and in the direction away from the center of the window portion 101, the non-window portion 102 bends into an arc shape toward the display module 30.

Specifically, the bonding layer 20 includes a first bonding portion 201 and a second bonding portion 202. The first bonding portion 201 is a first OCA (optical adhesive) layer, and the first bonding portion 201 is adhered between the window portion 101 and the display module 30, as shown in FIG. 1 and FIG. 2. The surface of the non-window portion 102 facing the display module 30 is provided with an ink layer 40. The second bonding portion 202 is an OCR (liquid adhesive) layer, which is adhered between the ink layer 40 and the display module 30. That is, while the surface of the non-window portion 102 facing the display module 30 is provided with an ink layer 40, the second bonding portion 202 sandwiched between the ink layer 40 and the display module 30 is an OCR (liquid adhesive) layer. It can be understood that under certain temperature changes, the status of the OCR (liquid adhesive) layer will be transformed between liquid and solid. Since the OCR (liquid adhesive) layer is liquid during the process of bonding the non-window portion 102 and the display module 30, the liquid OCR (liquid adhesive) layer is conducive to filling and compensating against the ink, ensuring improved filling capacity and compensating capacity for level difference caused by the ink, without affecting the process stability, so that it is possible to substantially eliminate the problem of bubble defects generated in the bonding process in the prior art due to the poor ability of OCA to fill the level difference, the product rejection is avoided, and meanwhile, it is helpful to achieve a thinner design of the display-module assembly 100.

Optionally, the optical refractive, light transmittance and thermal expansion coefficient of the OCR (liquid adhesive) layer are the same as those of the first OCA (optical adhesive) layer. This is helpful to ensure the display reliability of the display module 30.

Example 2

As shown in FIGS. 4-6, the display-module assembly 100 according to the embodiments of the present application includes a cover plate 10, a display module 30 and a bonding layer 20.

Specifically, the cover plate 10 includes a window portion 101 and a non-window portion 102 surrounding the window portion 101 peripherally. The display module 30 is disposed at the inner side of the cover plate 10 and aligned with the window portion 101 and the non-window portion 102 respectively. The window portion 101 has a planar form, and in the direction away from the center of the window portion 101, the non-window portion 102 bends into an arc shape toward the display module 30.

Specifically, the bonding layer 20 includes a first bonding portion 201 and a second bonding portion 202. The first bonding portion 201 is a first OCA (optical adhesive) layer. The first bonding portion 201 is adhered between the window portion 101 and the display module 30. As a result, the bonding between the window portion 101 and the display module 30 is achieved by applying the first portion 201, furthermore, because the first OCA (optical adhesive) is solid, the bonding process of bonding the window portion 101 and the display module 30 is simplified, the problem of glue overflow is avoid, and the reliability of bonding is improved.

The second bonding portion 202 is adhered between the non-window portion 102 and the display module 30. The second bonding portion 202 includes a second OCA (optical adhesive) layer 2021 and an ink layer 40 disposed within the second OCA (optical adhesive) layer 2021. That is, instead of providing the ink layer 40 on the cover plate 10 as the prior art, the ink layer 40 is disposed within the second OCA (optical adhesive) layer 2021, so that the second bonding portion 202 and the first bonding portion 201 with substantially the same thickness may be used for bonding when the cover plate 10 and the display module 30 are adhered by the bonding layer 20, which is helpful to a better fit, thus the bonding effect can be improved. By doing so, the problem of the level difference caused by the ink layer 40 in the related art is solved, thereby substantially eliminating the problem of bubble defects generated in the bonding process in the prior art due to the poor ability of OCA to fill the level difference, the product rejection is avoided, the process stability is not affected, and meanwhile, it is helpful to achieve a thinner design of the display-module assembly 100.

Specifically, as shown in FIGS. 5 and 6, the second OCA (optical adhesive) includes a first adhesive sub-layer 20211 and a second adhesive sub-layer 20212 spaced apart along the offsetting direction between the cover plate 10 and the display module 30. The ink layer 40 is sandwiched between the first adhesive sub-layer 20211 and the second adhesive sub-layer 20212. The ink layer 40, the second OCA (optical adhesive) layer 2021 and the first OCA (optical adhesive) layer are formed integrally, i.e. the bonding layer 20 is formed as one piece. During the actual preparation of the bonding layer 20, a first adhesive layer, including the first adhesive sub-layer 20211 and a first window adhesive layer corresponding to the window portion 101, may be prepared first, then a layer of ink layer 40 may be printed on the first adhesive sub-layer 20211, and then a second adhesive layer, including the second adhesive sub-layer 20212 and a second window adhesive layer corresponding to the window portion 101, is prepared. It can be understood that, the second window adhesive layer may be relatively thicker, so as to fill the level difference caused by the ink layer 40. Thus, the level difference caused by the ink layer 40 is compensated inside the bonding layer 20, which is simple and reliable, and is helpful to ensure the bonding ability of the bonding layer 20.

An electronic device 1000 according to embodiments of the present application is described below.

Figure 7:
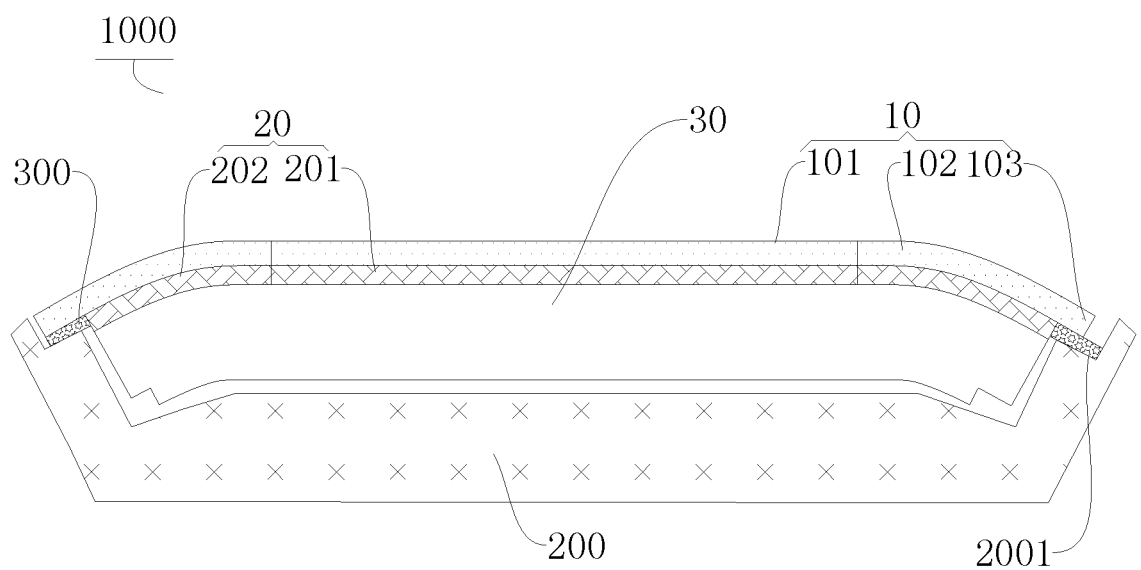
FIG. 7 is a schematic view of an electronic device according to embodiments of the present application.

As shown in FIG. 7, an electronic device 1000 according to embodiments of the present application may include the display-module assembly 100 described above; and a housing 200, one side of which is open. The display-module assembly 100 is disposed on the open side of the housing 200.

With the display-module assembly 100, the electronic device 1000 according to the embodiments of the present application is able to substantially solve the problem of bubble defects generated in the bonding process in the prior art due to the poor ability of OCA to fill the level difference, the product rejection is avoided, and meanwhile, it is helpful to achieve a thinner design of the display-module assembly 100.

It can be understood that the display module 30 may include a display screen, a touch screen, etc. The specific structure of the display module 30 is well known to those skilled in the art and will not be described in detail here.

In some optional embodiments of the present application, as shown in FIG. 1, FIG. 4 and FIG. 7, the cover plate 10 further includes an installing portion 103 which surrounds the non-window portion 102 peripherally. A step portion 2001 is formed on the end face of the open end of the housing 200, and the installing portion 103 abuts against the step portion 2001, thereby facilitating the installation of the display-module assembly 100.

Optionally, the step portion 2001 and the installing portion 103 are connected by the glue layer (sealant layer) 300. For example, the step portion 2001 may be connected with the installing portion 103 by a glue dispensing process.

Optionally, the color of the glue layer 300 is the same as that of the ink layer 40. Specifically, the glue layer 300 and the ink layer 40 are both black. Therefore, it may achieve a uniform black appearance of the installing portion 103 and the non-window portion 102, which is helpful to improve the aesthetics of the electronic device 1000 and avoid color inconsistency.

In the description of the specification, references like "an embodiment", "some embodiments", "schematic embodiment", "an example", "a specific example" or "some examples" intend to indicate that specific features, structures, materials, or characteristics described in connection with the embodiment or example is associated with at least one embodiment or example of the present application. In this description, general reference of the above terms is not necessarily directed to the same embodiment or example. Moreover, the specific features, structures, materials, or characteristics described may be combined in any one or more embodiments or examples in a proper way.

Although the specific embodiments of the present application have been illustrated and described, those of ordinary skill in the art will understand that various changes, modifications, substitutions and variations can be made to these embodiments without departing from the principles and concept of the present application. The scope of the present application is defined by the claims and their equivalents.

What I claim is:

1. A display-module assembly, comprising:
   a cover plate comprising a window portion and a non-window portion surrounding the window portion;
   a display module disposed at an inner side of the cover plate; and
   a bonding layer comprising a first bonding portion and a second bonding portion, the first bonding portion being a first Optically Clear Adhesive (OCA) optical adhesive layer and adhered between the window portion and the display module,
   wherein the second bonding portion is adhered between the non-window portion and the display module, and the second bonding portion comprises a second OCA optical adhesive layer and an ink layer disposed within the second OCA optical adhesive layer,
   wherein the second OCA optical adhesive layer includes a first adhesive sub-layer and a second adhesive sub-layer spaced apart along an offsetting direction between the cover plate and the display module, and the ink layer is sandwiched between the first adhesive sub-layer and the second adhesive sub-layer, and
   wherein the first adhesive sub-layer is located between the display module and the ink layer, and the second adhesive sub-layer is located between the non-window portion and the ink layer.

2. The display-module assembly according to claim 1, wherein the ink layer, the second OCA optical adhesive layer and the first OCA optical adhesive layer are formed integrally.

3. The display-module assembly according to claim 1, wherein, in a direction away from a center of the window portion, the non-window portion bends in an arc shape toward the display module.

4. An electronic device, comprising
a housing, one side of which is open; and
the display-module assembly according to claim 1, wherein the display-module assembly is disposed on the open side of the housing.

5. The electronic device according to claim 4, wherein the cover plate further comprises an installing portion which surrounds the non-window portion peripherally, and wherein a step portion is formed on an end face of an open end of the housing, and the installing portion abuts against the step portion.

6. The electronic device according to claim 5, wherein the step portion and the installing portion are connected by a glue layer.

7. The electronic device according to claim 6, wherein the glue layer has the same color as the ink layer.

8. The electronic device according to claim 4, wherein the electronic device is a mobile phone.

9. The display-module assembly according to claim 1, wherein the ink layer, the second OCA optical adhesive layer and the first OCA optical adhesive layer are formed integrally.

10. The display-module assembly according to claim 2, wherein, in a direction away from a center of the window portion, the non-window portion bends in an arc shape toward the display module.

* * * * *